Aug. 12, 1958 P. D. BECKER 2,846,744
FASTENING DEVICE
Filed Dec. 21, 1953

INVENTOR:
PHILIP D. BECKER,
By Robert E Ross
ATTORNEY.

United States Patent Office 2,846,744
Patented Aug. 12, 1958

2,846,744

FASTENING DEVICE

Philip Dix Becker, Hingham, Mass., assignor, by mesne assignments, to United-Carr Fastener Corporation, Boston, Mass., a corporation of Delaware Application December 21, 1953, Serial No. 399,499

1 Claim. (Cl. 24—108)

This invention relates generally to securing devices, and has particular reference to a sheet metal fastener for assembly into gripping engagement with a stud.

In the manufacture of automobiles, refrigerators, and similar articles in which a nameplate, ornament, or other device is attached to a sheet metal panel, it is customary to provide projecting studs on the device to protrude through suitable openings in the panel, with fastening devices assembled onto the studs on the rear side of the panel to retain the device tightly against the panel.

Fasteners that have been used for this purpose have had a number of disadvantages, in that they do not hold the device tightly enough, or are too expensive, or become loose during service. Many of such fastening devices utilize the principle of the inclined tongue, having an end biting into the surface of the stud. One disadvantage of this particular type of fastener is that when it is assembled onto a stud and pushed tightly against the panel through which the stud protrudes, the fastener must back away from the panel a slight distance to permit the inclined tongues to dig into the stud. Hence the fastener does not pull the stud tightly against the face of the panel.

The object of this invention is to provide a fastener for assembly onto a stud, in which resilient portions are provided for engagement with the surface of the panel through which the stud extends.

Another object of the invention is to provide a securing device for assembly onto a stud projecting through a panel opening, which is provided with means for maintaining engagement with the plate which is independent of the means for engaging the stud.

Other objects of the invention will, in part, be obvious, and will, in part, appear hereinafter.

Figure 1:
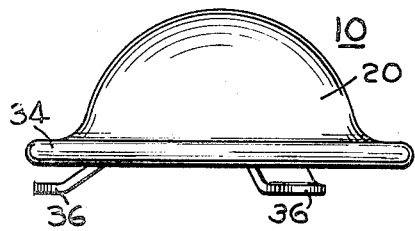
Fig. 1 is a view in side elevation of a fastening device embodying the features of the invention.
Figure 2:
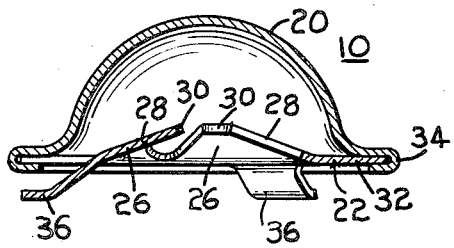
Fig. 2 is a view in section of the fastener of Fig. 1.
Figure 3:
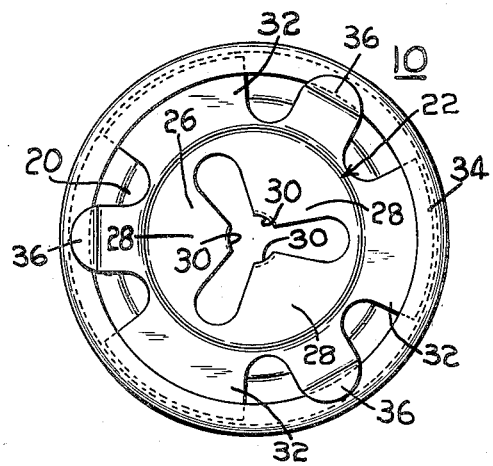
Fig. 3 is a bottom plan view of the fastener of Fig. 1.
Figure 4:
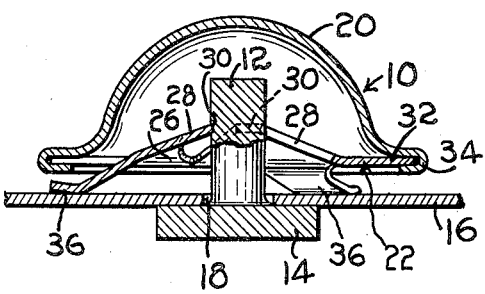
Fig. 4 is a view in section of the fastener assembled onto a stud.

Referring now to the drawing, there is illustrated a fastening device 10, which is adapted for assembly onto a stud 12 of a device 14, to retain the device in assembly on a panel 16 with the stud extending through an opening 18 in the panel.

The device 14 to be attached to the panel may be a nameplate, ornament, or the like, and may be formed of plastic, die cast metal, or other suitable material.

The fastening device 10 comprises generally a dome-shaped cap portion 20 and an attaching plate 22 assembled therewith. The attaching plate 22 comprises a central cone-shaped portion 26, with a series of tongues 28 formed therein which extend generally toward each other and are inclined upwardly in relation to the base, terminating in spaced biting ends 30 for receiving a stud centrally thereof.

The outer portion of the base is provided with a group of radially extending segments 32, and to retain the plate in assembly with the cap, the lower periphery of the cap has a radially extending flange portion 34, the periphery of which is curled back enclosing the ends of the segments 32. The plate 22 is also provided with a series of legs 36 formed in the base, and said legs extend radially outwardly from the periphery of the cone-shaped portion and are inclined slightly downwardly to terminate beneath the outermost rim of the dome-shaped cap.

The fastener 10 is assembled in the usual manner, by pushing the cap onto the stud so that it enters between the biting ends 30 of the tongues, flexing the tongues upwardly. As the fastener is pushed onto the stud, the legs 36 contact the panel and flex upwardly against the rim of the cap. When the driving force is released, the legs tend to lift the fastener upwardly causing the tongues to dig into secure engagement with the surface of the stud, with the legs continuing to bear tightly against the panel.

Although in the illustrated embodiment, three tongues and legs are used, it will, of course, be understood that other numbers may be used if desired.

Since certain obvious modifications may be made in the device without departing from the scope of the invention, it is intended that all matter contained herein be interpreted in an illustrative and not in a limiting sense.

I claim:

A securing device for assembly onto a stud projecting through a panel opening, comprising a dome-shaped cap having an inturned lower edge, and an attaching plate retained by said inturned edge, said attaching plate having a medial portion which is generally cone-shaped and extending upwardly into the cap, said cone-shaped portion having a group of tongues formed therein with biting ends for engaging an inserted stud, said attaching plate having a group of radially extending substantially flat portions extending from the periphery of the cone-shaped portion, the outer edges of said radially extending portions being retained by said inturned edge of the cap, and resilient legs disposed intermediate the radially extending flat portions, said legs extending radially from the periphery of the cone-shaped portion and being inclined slightly downwardly, said legs being capable of upward flexing independent of said tongues formed in the cone-shaped portion.

References Cited in the file of this patent

UNITED STATES PATENTS

| | | |
|---|---|---|
| 2,308,424 | Morehouse | Jan. 12, 1943 |
| 2,334,046 | Tinnerman | Nov. 9, 1943 |
| 2,339,664 | Tinnerman | Jan. 18, 1944 |
| 2,342,690 | Place | Feb. 29, 1944 |
| 2,367,659 | Burke | Jan. 23, 1945 |
| 2,401,207 | Wagstaff | May 28, 1946 |